Sept. 21, 1943.    F. H. NICKLE ET AL    2,330,138
METHOD OF MAKING BIMETAL CUTTING ELEMENTS
Filed July 5, 1941

INVENTOR.
Frank H. Nickle
BY Arthur D. Nickle
Frank C. Farman
ATTORNEY.

Patented Sept. 21, 1943

2,330,138

UNITED STATES PATENT OFFICE 2,330,138

METHOD OF MAKING BIMETAL CUTTING ELEMENTS

Frank H. Nickle and Arthur G. Nickle, Saginaw, Mich.

Application July 5, 1941, Serial No. 401,260

3 Claims. (Cl. 76—101)

This invention relates to an improved method of making bi-metal cutting elements having relatively hard wear-resistant cutting edges, such elements being adapted for use in machines that reduce materials by cutting, shredding, impact or crushing action. Such a machine constitutes the subject matter in a separate application for patent filed by us.

The conventional method of making bi-metal cutting elements having hard wear-resistant cutting edges is to form the body of the elements from relatively soft metal, fuse a bead or overlay of the wear-resistant metal to the cutting edge, and then grind away the excess of the wear-resistant metal to provide a sharp cutting edge. This grinding operation is difficult and expensive due to the hardness of the metal, and is also wasteful of the costlier wear-resistant metal which must be ground off to obtain the sharp cutting edge. An object of this invention is to provide a method of producing such wear-resistant cutting edges without the loss of the expensive wear-resistant metal that is ordinarily ground away; also, to save the labor and expense incidental to the grinding operations.

In carrying our invention into practice, we provide the base elements 6 ordinarily made of soft steel and hereinafter referred to as base metal. These elements are first formed to the required shape and size and a flatted surface 7 is provided on the upper edge thereof to receive the wear-resistant metal. These formed elements are then assembled in pairs with the working faces juxtaposed, the edges 8 being brought together in close relation and in parallel alignment to form a trough in which the wear-resistant metal 9 is deposited and fused to the base metal, the fusion being accomplished by arc or gas welding in the conventional manner. The fused bead of wear-resistant metal joins the two elements together, but it will be noted that the base metal in the elements does not unite or fuse together.

Figure 1:
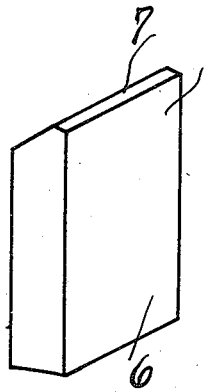
Fig. 1 is an isometric view showing one of the base elements.
Figure 2:
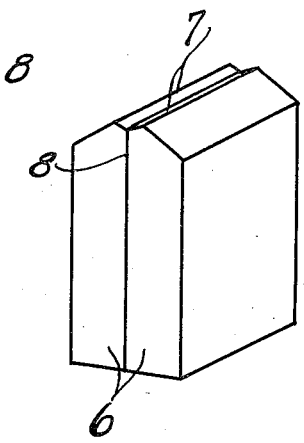
Fig. 2 is also an isometric view showing a pair of formed elements in assembled relation before the application of the wear-resistant metal.
Figure 3:
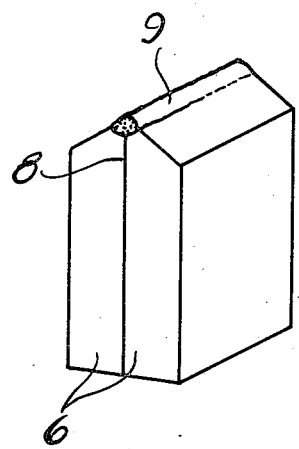
Fig. 3 is a similar view showing the elements joined together by the fused bead of wear-resistant metal.
Figures 4, 5:
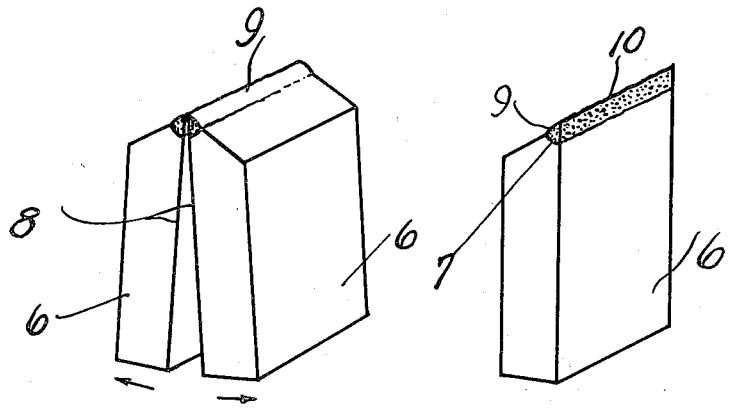
Fig. 4 is also an isometric view illustrating the fracturing of the wear-resistant metal.
Fig. 5 is a view similar to Fig. 1, showing the finished bi-metal element.

The next step in the method is to cool the assembly, after which the two elements are separated by fracturing the bead of wear-resistant metal longitudinally and parallel to the working faces of the elements. This fracture is readily made without resorting to cutting or machining either the base metal or the wear-resistant metal, the preferred practice being to spread the butts of the elements apart, as clearly indicated by the arrows in Fig. 4, the included angle being gradually increased until the strain is sufficient to rupture the hard bead of wear-resistant metal. This fracture simultaneously produces sharp cutting edges 10 on both elements as clearly shown in Fig. 5 of the drawing.

Identically the same result may be achieved by pairing the cutting elements in V-shaped formation with the butts of the elements spread apart a predetermined distance, and after the bead of wear-resistant metal has been fused to the aligned cutting edges and the assembly cooled, the bead may be fractured by forcing the butts toward each other to close the gap between them. This will also fracture the bead parallel to the working face of the cutting elements and produce the same results as above described.

The sharp wear-resistant cutting edges 10 produced by the above procedure require no subsequent grinding for the purpose intended. In comparison with similar sharp wear-resistant cutting edges produced in the conventional manner, it will be seen that the saving in labor is of major importance. This labor saving not only covers the complete elimination of the subsequent grinding operation, but the time necessary to apply the fused bead of wear-resistant metal is substantially halved, because two cutting edges are hard surfaced in one operation. There is also a considerable saving in the expensive wear-resistant metal, none of which is wasted by machining or grinding.

Another noteworthy feature is the fact that this method makes it practical to manufacture bi-metal cutting elements that have sharp wear-resistant cutting edges made of the hardest of all carbide metals, such metals being too hard to be economically ground, or otherwise machined, to produce sharp edges of the class described.

What we claim is:

1. The method of producing bi-metal elements having a wear-resistant edge that is suitable for reducing materials by crushing, shredding and cutting, which consists in forming the body elements to finished shape and size assembling formed elements in pairs with like faces juxtaposed and the predetermined cutting edges aligned in close parallel relation, fusing a single bead of wear-resistant metal to the aligned edges without uniting the body metals, cooling the assembly, and then separating the bi-metal elements by fracturing the bead longitudinally, thereby simultaneously producing a sharp irregular cutting edge on both elements.

2. The method of producing a bimetal cutting element having a sharp wear-resistant cutting edge for reducing materials by crushing, shredding, and cutting action, which consists in assembling a pair of formed body elements together with like faces juxtaposed and the predetermined cutting edges aligned in close parallel relation, fusing a single bead of wear-resistant metal to the aligned edges without uniting the body metals, cooling the assembly, and then parting the said elements by fracturing the bead of wear-resistant metal.

3. In the manufacture of bi-metal elements having a wear-resistant cutting edge adapted for reducing fibrous materials, which consists in placing the elements face to face in pairs with the predetermined cutting edges in aligned parallel relation, fusing a single bead of hard wear-resistant metal to the aligned edges without uniting the soft metals, cooling the assembly, and then moving the butt ends of the elements with relation to each other to produce a fracture that is substantially in the plane of the working face of both elements.

FRANK H. NICKLE.
ARTHUR G. NICKLE.